US006708485B2

(12) United States Patent
Hinder et al.

(10) Patent No.: US 6,708,485 B2
(45) Date of Patent: Mar. 23, 2004

(54) EXHAUST SYSTEM FOR A MOTOR VEHICLE

(75) Inventors: Axel Hinder, Borchen (DE); Christian Smatloch, Paderborn (DE); Walter Gross, Detmold (DE); Jürgen Kleinschmidt, Beverungen (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 10/198,065

(22) Filed: Jul. 17, 2002

(65) Prior Publication Data

US 2003/0033801 A1 Feb. 20, 2003

(30) Foreign Application Priority Data

Aug. 17, 2001 (DE) .......................................... 101 39 424

(51) Int. Cl.$^7$ ................................................ F01N 3/00
(52) U.S. Cl. .............................. 60/288; 60/298; 60/320
(58) Field of Search ........................ 60/287, 288, 298, 60/320

(56) References Cited

U.S. PATENT DOCUMENTS

| 5,934,071 A | * | 8/1999 | Schatz ........................ 60/288 |
| 5,934,073 A | * | 8/1999 | Gieshoff et al. ............... 60/320 |
| 6,141,961 A | * | 11/2000 | Rinckel ....................... 60/288 |
| 6,155,042 A | * | 12/2000 | Perset et al. .................. 60/298 |
| 6,185,935 B1 | * | 2/2001 | Dickers et al. ............... 60/288 |
| 6,422,007 B1 | * | 7/2002 | Hartick ........................ 60/298 |

* cited by examiner

Primary Examiner—Thomas Denion
Assistant Examiner—Tu M. Nguyen
(74) Attorney, Agent, or Firm—Henry M. Feiereisen

(57) ABSTRACT

An exhaust system used for a motor vehicle and extending between an exhaust-generating internal combustion engine and an exhaust pipe for release of exhaust into the surrounding environment, includes a three-way catalytic converter disposed in proximity of the combustion engine, a $NO_x$-adsorber disposed upstream of the exhaust pipe, and an exhaust line, which extends between the catalytic converter and the $NO_x$-adsorber, for conducting exhaust. The exhaust line includes an inner tube, an outer tube in spaced-apart surrounding relationship to the inner tube to define a space, and a separation tube received in the space, to thereby define between the inner tube and the separation tube an inner annular gap for conducting exhaust, and between the outer tube and the separation tube an outer annular gap for conducting a coolant. A shut-off device is integrated in the inner tube for regulating the flow of exhaust through the inner tube.

15 Claims, 2 Drawing Sheets

EXHAUST SYSTEM FOR A MOTOR VEHICLE

CROSS-REFERENCES TO RELATED APPLICATIONS

This application claims the priority of German Patent Application Serial No. 101 39 424.1, filed Aug. 17, 2002, pursuant to 35 U.S.C. 119(a)–(d), the subject matter of which is incorporated herein by reference.

BACKGROUND OF THE INVENTION

The present invention relates, in general, to an exhaust system for a motor vehicle.

Internal combustion engines, in particular Otto engines with direct fuel injection, typically run in lean-combustion operation and have understoichiometric operating points in order to realize a lowest possible fuel consumption. As a consequence, current catalytic converters, in particular three-way catalytic converters, are not capable to completely convert harmful components hydrocarbons (HC), carbon monoxide (CO) and nitrogen oxide ($NO_x$) into non-toxic compounds such as carbon dioxide ($CO_2$), nitrogen ($N_2$) or water ($H_2O$). The reason for the incomplete conversion of the harmful components is low exhaust temperatures in the test cycle, higher HC-emissions during lean-combustion operation of the Otto engines, and in particular the need for $NO_x$-reduction in the oxygen-rich exhaust gas.

In order to achieve $NO_x$ efficiencies of above 90% at a temperature range between 300° C. and 500° C., the provision of a particular exhaust aftertreatment is proposed. One approach of an exhaust aftertreatment involves the arrangement of a three-way catalytic converter near the engine and a $NO_x$-adsorber underneath the bottom of the motor vehicle. Such an arrangement must, however, reconcile two contradicting requirements. On the one hand, the three-way catalytic converter should be raised in shortest possible time (light off time) to an operating temperature of >350° C. On the other hand, the exhaust temperature should not exceed 500° C. to prevent adverse effect on the maximum temperature resistance of the $NO_x$-adsorber.

To date, the first requirement has been realized through use of air-gap insulated exhaust lines of double-walled configuration, comprised of a thin-walled inner tube with slight heat storage capacity, resulting in a low heat withdrawal from the exhaust and thus in a rapid heating of the catalytic converter, and an outer tube, which realizes the tightness to the outside and provides also a load-carrying function.

The second requirement, however, has been difficult to meet satisfactorily heretofore because of the presence of temperatures of well above 500° C., in particular in the high-load range or high-speed range, upstream of the $NO_x$-adsorber. As a consequence, it has been proposed to provide fairly long exhaust lines to thereby cool the exhausts on their way to the $NO_x$-adsorbers. Still, the temperature stress remains very high so that the service life of currently available $NO_x$-adsorbers is insufficient.

Attempts have been undertaken to employ engine-internal measures, such as cooling by means of fuel, i.e. enrichment of the fuel/air mixture, in order to lower the temperature stress. Such engine-internal measures significantly lead, however, to a deterioration of the overall efficiency.

It would therefore be desirable and advantageous to provide an improved exhaust system which obviates prior art shortcomings and which can be configured to include a three-way catalytic converter and a $NO_x$-adsorber while still resulting in a lower fuel consumption and less emission into the environment as well as is able to prolong the service life of the $NO_x$-adsorber.

SUMMARY OF THE INVENTION

According to one aspect of the present invention, an exhaust system used for a motor vehicle and extending between an exhaust-generating internal combustion engine and an exhaust pipe for release of exhaust into the surrounding environment, includes a three-way catalytic converter disposed in proximity of the combustion engine; a $NO_x$-adsorber disposed upstream of the exhaust pipe, an exhaust line extending between the catalytic converter and the $NO_x$-adsorber for conducting exhaust, wherein the exhaust line includes an inner tube, an outer tube in spaced-apart surrounding relationship to the inner tube to define a space therebetween, and a separation tube disposed in the space between the inner tube and the outer tube, to thereby define between the inner tube and the separation tube an inner annular gap for conducting exhaust, and between the outer tube and the separation tube an outer annular gap for conducting a coolant; and a shut-off device for regulating a flow of exhaust through the inner tube.

The present invention resolves prior art problems by applying the double-wall technique with inner tube and separation tube to form the insulating inner annular gap for conduction of the exhaust at slight heat loss so as to realize a rapid heating of the three-way catalytic converter, in combination with the formation of a further outer annular gap between the separation tube and the outer tube for conduction of coolant. Thus, after activation of the shut-off device to bar a flow through the inner tube, exhaust is able to flow only through the inner annular gap for intimate contact with the coolant to thereby realize a cooling of the exhaust. As a result, exhaust admitted to the $NO_x$-adsorber is effectively cooled down to a temperature that is appropriate for the $NO_x$-adsorber.

The invention thus reconciles the seemingly contradictory requirements of implementing a rapid heating of the three-way catalytic converter and cooling of exhaust after this heating for processing by the $NO_x$-adsorber. Fuel consumption is more efficient while reducing emission from the exhaust system. Since the $NO_x$-adsorber is no longer exposed to excessive temperatures, its service life is significantly prolonged. As a consequence of the clear functional separation, different components of the exhaust system may be manufactured of specifically suitable materials so that the service life of those components that are used for exhaust conduction is prolonged as well. Moreover, weight of the exhaust system may be reduced.

According to another feature of the present invention, the inner tube has an entry zone for the exhaust, with the entry zone being fluidly connected to the inner annular gap. This may be realized by providing the wall of the inner tube with suitable transfer apertures.

According to another feature of the present invention, the shut-off device may be disposed in the entry zone of the inner tube. Suitably, the shut-off device is a butterfly valve. Operation of the shut-off device may be realized in dependence on a temperature level of the exhaust in the exhaust line upstream of the $NO_x$-adsorber.

According to another feature of the present invention, the inner tube has an engine-distal end which is constructed to allow relative mobility or adjustability of the inner tube. In this way, different expansions of various components of the exhaust system, caused by different temperatures, can be compensated. The mobility of the inner tube may be realized by providing the engine-distal end of the inner tube with a sliding seat. Suitably, the engine-proximal end of the inner tube may be welded to the catalytic converter.

According to another feature of the present invention, there may be provided a cooling unit, which is fluidly connected to the outer annular gap for re-cooling the coolant after flowing in counterflow direction to the exhaust. The cooling unit may include a heat exchanger and a circulation pump for urging the coolant to flow in counterflow direction to the exhaust. Suitably, the heat exchanger may be an air/coolant heat exchanger.

The tubes are suitably formed by means of internal high-pressure technique so that cross sections other than round cross section, as well as punchings for passages can be realized at smaller manufacturing tolerances.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
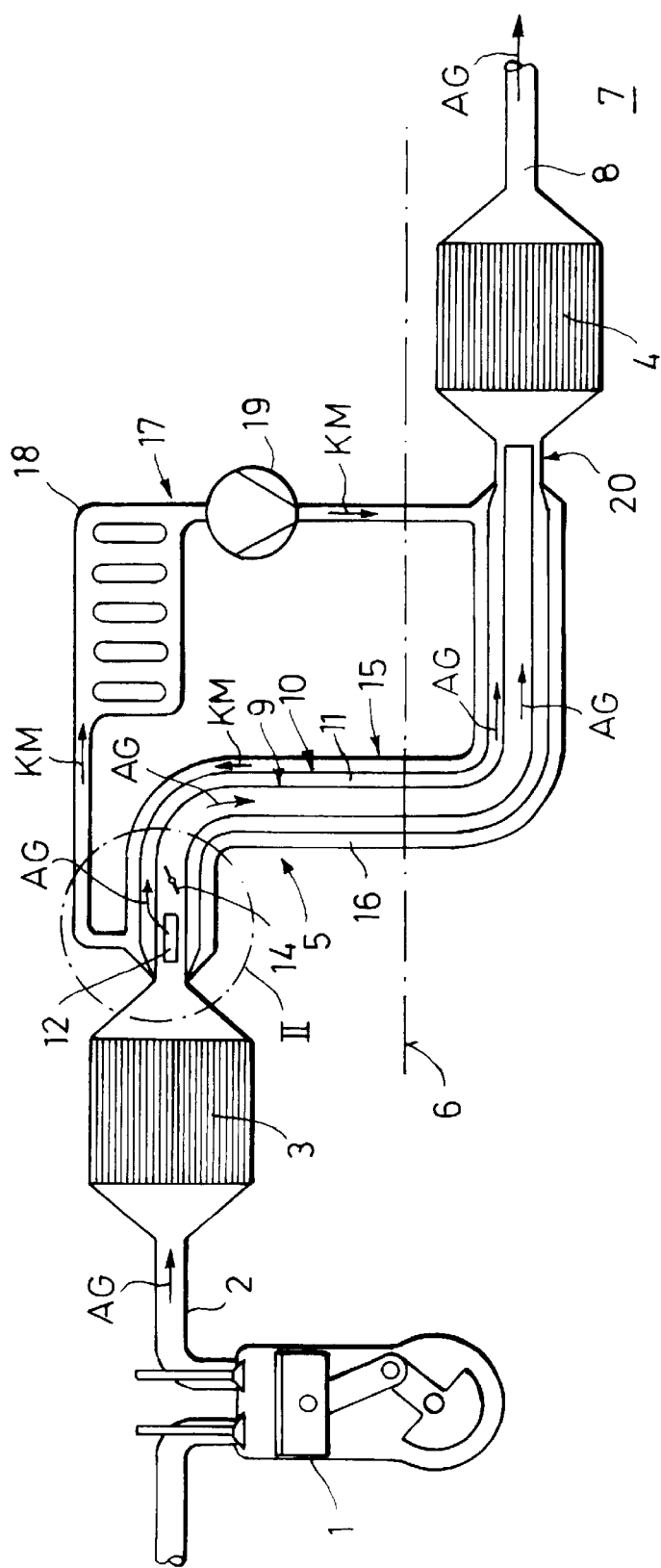
FIG. 1 is a schematic vertical longitudinal section of an internal combustion engine combined with an exhaust system according to the present invention.

Throughout all the Figures, same or corresponding elements are generally indicated by same reference numerals.

Turning now to the drawing, and in particular to FIG. 1, there is shown a schematic vertical longitudinal section of an internal combustion engine 1, e.g. in the form of a Otto engine with direct fuel injection, in combination with an exhaust system according to the present invention. Construction and operation of the internal combustion engine 1 are generally known to the artisan so that a detailed description thereof is omitted for the sake of simplicity. The exhaust system includes an exhaust manifold 2 for conducting exhaust AG from the internal combustion engine 1 to a three-way catalytic converter 3 which is disposed in proximity of the engine 1 and provided to change harmful pollutants into to harmless compounds before release into the environment. A multi-channel exhaust line, generally designated by reference numeral 5, extends from the catalytic converter 3 to a $NO_x$-adsorber 4 which is positioned beneath the bottom 6 of a, not shown, motor vehicle and is connected to an exhaust pipe 8 for release of exhaust AG into the environment. Construction and operation of the catalytic converter 3 and $NO_x$-adsorber 4 are also generally known to the artisan and not described in more detail for sake of simplicity.

The exhaust line 5 includes an inner tube 9 which provides a direct connection between the catalytic converter 3 and the $NO_x$-adsorber 4. The inner tube 9 is surrounded by a separation tube 10 at formation of an inner annular gap 11 therebetween.

Figure 2:
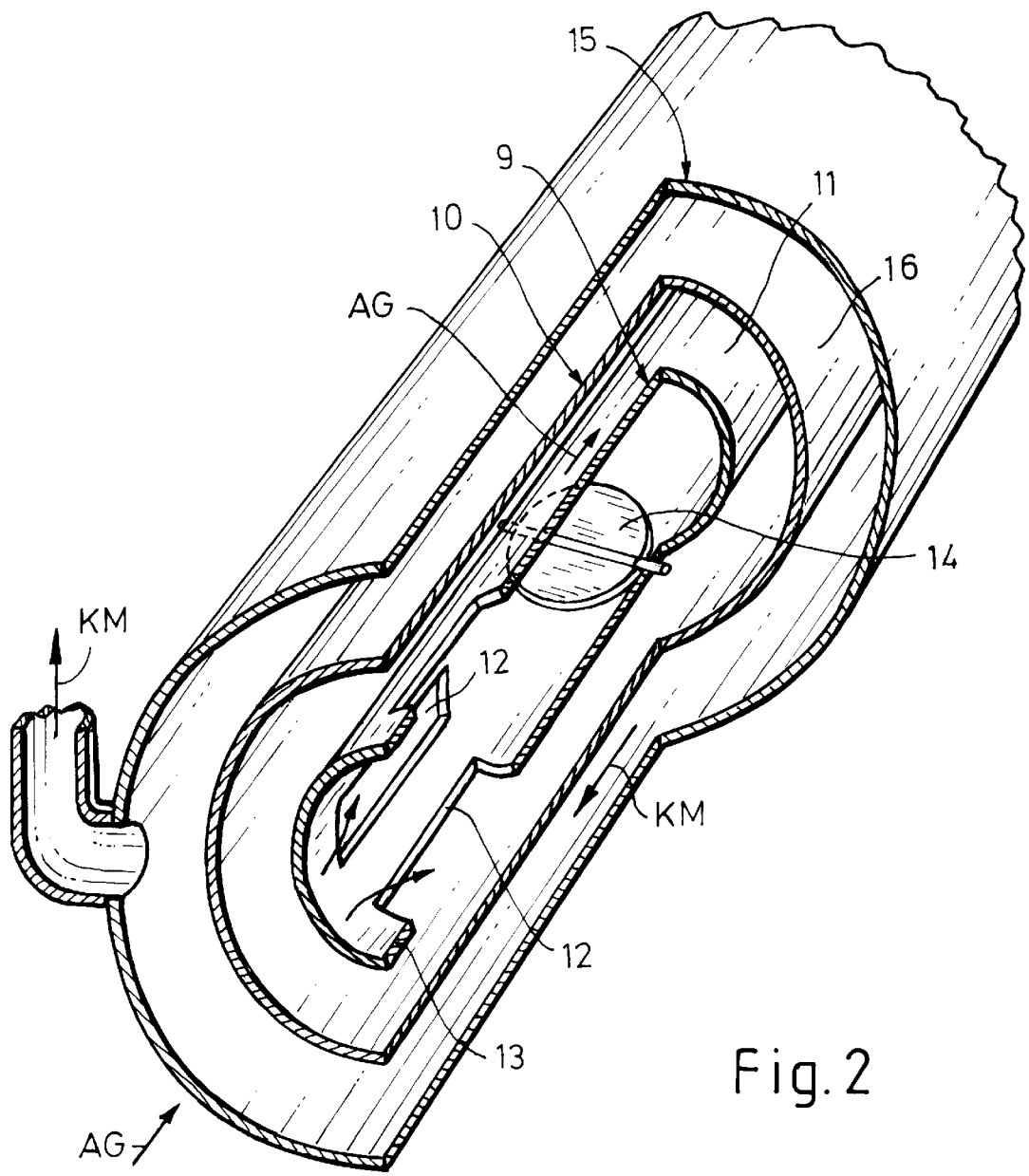
FIG. 2 is a perspective cutaway view, on an enlarged scale, of the area encircled in FIG. 1 and marked II.

As shown in particular in FIG. 2, the inner tube 9 has a thin wall 13 which is formed with transfer apertures 12 in an entry zone for the exhaust AG into the inner tube 9, so as to allow exhaust AG to flow also into the inner annular gap 11 for conduction to the $NO_x$-adsorber 4. Disposed in the inner tube 9 in flow direction of exhaust AG downstream of the transfer apertures 12 is a shut-off device 14 for regulating a flow of exhaust AG through the inner tube 14. The shut-off device 14 may be a butterfly valve constructed to completely block the flow cross section of the inner tube 9. Operation of the shut-off device 14 may be realized by an underpressure cell or controlled by the exhaust via the bimetallic principle. Of course, other means at the disposal of the artisan may be employed as well for operating the shut-off device, e.g., electromechanical actuation of the shut-off device 14.

The separation tube 10 is surrounded by an outer tube 15 at formation of an outer annular gap 16 therebetween for conduction of a coolant KM. As shown in FIG. 1, the outer annular gap 16 is fluidly connected to a cooling unit 17 which includes a heat exchanger 18, e.g. an air/coolant heat exchanger, and a circulating pump 19 for conducting the coolant KM through the outer annular gap 16 in counterflow direction to the exhaust AG flowing in the inner annular gap 11.

The inner tube 9 has an engine-proximal end, which may be welded to the catalytic converter 3, and an engine-distal end 20, which is constructed to provide mobility relative to the separation tube 10 and the outer tube 15 so as to realize a compensation of different expansions between the inner tube 9, separation tube 10 and outer tube 15 as a result of different temperatures. An example of implementing a relative mobility of the engine-distal end of the inner tube 9 is the provision of a sliding seat at the end 20. Hereby, the separation tube 10 and the inner tube 9 may execute relative movements inside the outer tube 15 to decrease thermally induced tension.

At cold start of the internal combustion engine 1, the shut-off device 14 is set to allow flow of exhaust AG through the inner tube 9, so that exhaust AG flow through the inner tube 9 as well as through the annular gap 11, for conduction to the $NO_x$-adsorber 4. As the wall 13 of the inner tube 9 has a wall thickness which is constructed as thin as possible, only little heat is removed form exhaust AG so that the $NO_x$-adsorber 4 may commence as rapidly as possible with the conversion of $NO_x$. Once the maximum temperature of the exhaust AG in an area upstream of the $NO_x$-adsorber 4 is reached, the shut-off valve 14 is operated to block any flow of exhaust through the inner tube 9. As a consequence, exhaust AG can now flow only through the inner annular gap 11 between the inner tube 9 and the separation tube 10 in the direction to the $NO_x$-adsorber 4. As the inner annular gap 11 extends adjacent the outer annular gap 16, the exhaust AG is influenced by the coolant KM streaming in counterflow direction through the outer annular gap 16 so that the exhaust AG during conduction through the inner annular gap 11 is cooled down to a temperature appropriate for operation of the $NO_x$-adsorber 4.

While the invention has been illustrated and described as embodied in an exhaust system of a motor vehicle, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An exhaust system used for a motor vehicle and extending between an exhaust-generating internal combustion engine and an exhaust pipe for release of exhaust into the surrounding environment, said exhaust system, comprising:
   a three-way catalytic converter disposed in proximity of the combustion engine;
   a $NO_x$-adsorber disposed upstream of the exhaust pipe;
   an exhaust line extending between the catalytic converter and the $NO_x$-adsorber for conducting exhaust, said exhaust line including an inner tube, an outer tube in spaced-apart surrounding relationship to the inner tube to define a space therebetween, and a separation tube disposed in the space between the inner tube and the outer tube, to thereby define between the inner tube and the separation tube an inner annular gap for conducting exhaust, and between the outer tube and the separation tube an outer annular gap for conducting a coolant; and
   a shut-off device for regulating a flow of exhaust through the inner tube, wherein the inner tube has an engine-distal end constructed for providing mobility of the inner tube.

2. The exhaust system of claim 1, wherein the engine-distal end of the inner tube is formed with a sliding seat for attachment to the $NO_x$-adsorber.

3. The exhaust system of claim 1, wherein the inner tube has an engine-proximal end welded to the catalytic converter.

4. The exhaust system of claim 1, and further comprising a cooling unit fluidly connected to the outer annular gap for re-cooling the coolant.

5. The exhaust system of claim 4, wherein the cooling unit includes a heat exchanger and a circulation pump.

6. The exhaust system of claim 5, wherein the heat exchanger is an air/coolant heat exchanger.

7. The exhaust system of claim 1, wherein the inner tube has an entry zone for the exhaust, said entry zone being fluidly connected to the inner annular gap.

8. The exhaust system of claim 7, wherein the inner tube has a transfer opening in the entry zone for fluid connection to the inner annular gap.

9. The exhaust system of claim 7, wherein the shut-off device is disposed in the entry zone of the inner tube.

10. The exhaust system of claim 9, wherein the shut-off device is a butterfly valve.

11. The exhaust system of claim 9, and further comprising means for operating the shut-off device in dependence on a temperature level in the exhaust line upstream of the $NO_x$-adsorber.

12. A multi-channel exhaust line extending between a catalytic converter and a $NO_x$-adsorber of a motor vehicle for conducting exhaust, said exhaust line comprising:
   an inner tube extending between the catalytic converter and the $NO_x$-adsorber;
   an outer tube in spaced-apart surrounding relationship to the inner tube to define a space therebetween;
   a separation tube disposed in the space between the inner tube and the outer tube, to thereby define between the inner tube and the separation tube an inner annular gap for conducting exhaust from the catalytic converter, and between the outer tube and the separation tube an outer annular gap for conducting a coolant; and
   a shut-off device for regulating a flow of exhaust through the inner tube, wherein the inner tube has an converter-distal end constructed for providing mobility of the inner tube relative to the separation tube and the outer tube.

13. The exhaust line of claim 12, wherein the shut-off device is a butterfly valve.

14. The exhaust line of claim 12, wherein the inner tube is fluidly connected to the inner annular gap in an area upstream of the shut-off device.

15. The exhaust line of claim 14, wherein the inner tube has a transfer opening for fluid connection to the inner annular gap.

* * * * *